United States Patent
Kim et al.

(10) Patent No.: US 10,541,567 B2
(45) Date of Patent: Jan. 21, 2020

(54) WIRELESS POWER TRANSFER APPARATUS, WIRELESS POWER RECEIVING APPARATUS, WIRELESS POWER TRANSFER METHOD, WIRELESS POWER RECEIVING METHOD, WIRELESS POWER TRANSFER SYSTEM USING DUAL MODE AND RECORDING MEDIUM THEREOF

(71) Applicant: RESEARCH & BUSINESS FOUNDATION SUNGKYUNKWAN UNIVERSITY, Suwon-si (KR)

(72) Inventors: Dong In Kim, Seongnam-si (KR); Jong Jin Park, Suwon-si (KR); Jongho Moon, Suwon-si (KR); Kang Yoon Lee, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 189 days.

(21) Appl. No.: 15/857,302

(22) Filed: Dec. 28, 2017

(65) Prior Publication Data

US 2019/0089207 A1    Mar. 21, 2019

(30) Foreign Application Priority Data

Sep. 20, 2017    (KR) .......................... 10-2017-0121387

(51) Int. Cl.
*A63F 9/24* (2006.01)
*H02J 50/00* (2016.01)
(Continued)

(52) U.S. Cl.
CPC .............. *H02J 50/80* (2016.02); *H02J 7/025* (2013.01); *H02J 50/27* (2016.02); *H02J 50/40* (2016.02); *H04W 4/70* (2018.02); *H02M 7/06* (2013.01)

(58) Field of Classification Search
None
See application file for complete search history.

(56) References Cited

U.S. PATENT DOCUMENTS

| | | | | |
|---|---|---|---|---|
| 2009/0206165 A1* | 8/2009 | Laackmann | ....... | G06K 19/0707 235/492 |
| 2013/0063083 A1* | 3/2013 | Park | ...................... | H02J 7/0013 320/108 |
| 2013/0337756 A1* | 12/2013 | Wilson | .................. | H04B 5/0056 455/230 |

* cited by examiner

*Primary Examiner* — Jared Fureman
*Assistant Examiner* — Aqeel H Bukhari
(74) *Attorney, Agent, or Firm* — NSIP Law

(57) ABSTRACT

Disclosed are a wireless power transfer apparatus, a wireless power receiving apparatus, a wireless power transfer method, a wireless power receiving method, a wireless power transfer system using a dual mode and a recording medium thereof. A wireless power transfer apparatus transferring data and power to a wireless power receiving apparatus by using a power signal, includes: a signal generating unit generating the power signal for transferring the data and the power; a communication unit transferring the power signal generated by the signal generating unit to the wireless power receiving apparatus and communicating with the outside; and a control unit controlling the signal generating unit and the communication unit, and the signal generating unit generates the power signal according to one communication mode of a single tone transmission mode and a multi-tone transmission mode based on communication mode information transferred from the wireless power receiving apparatus through the communication unit, and the single tone transmission mode and the multi-tone transmission mode use different modulation schemes respectively.

20 Claims, 15 Drawing Sheets

(51) Int. Cl.
*H02J 50/80* (2016.01)
*H02J 50/27* (2016.01)
*H02J 7/02* (2016.01)
*H04W 4/70* (2018.01)
*H02J 50/40* (2016.01)
H02M 7/06 (2006.01)

[FIG. 1]
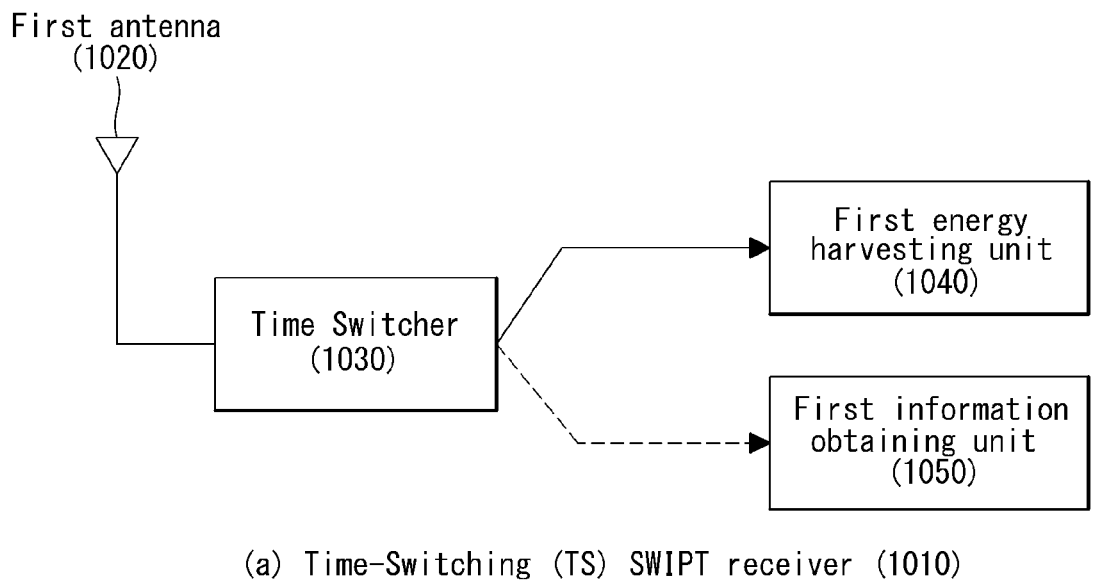
(a) Time-Switching (TS) SWIPT receiver (1010)
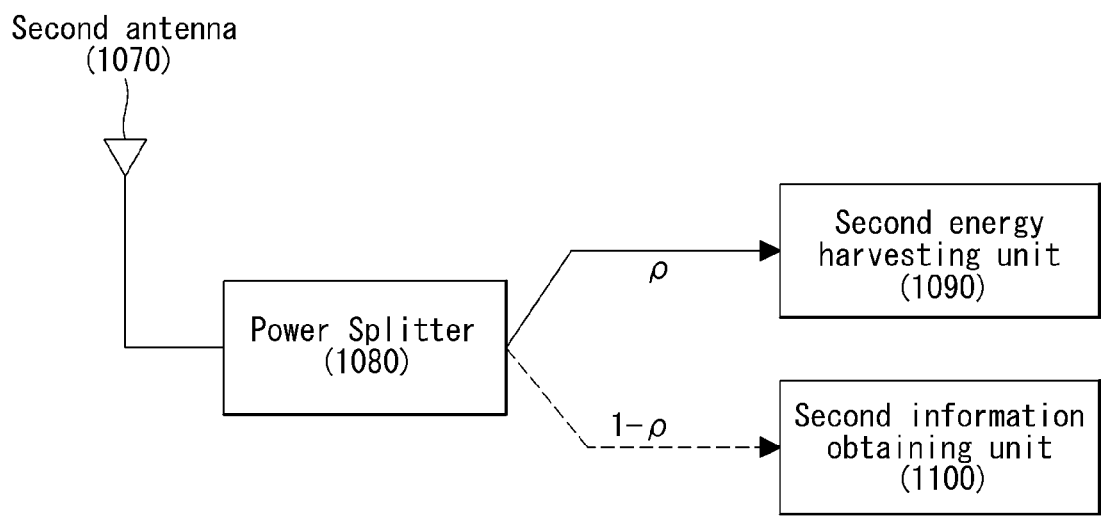
(b) Power-Splitting (PS) SWIPT receiver (1060)

[FIG. 2]
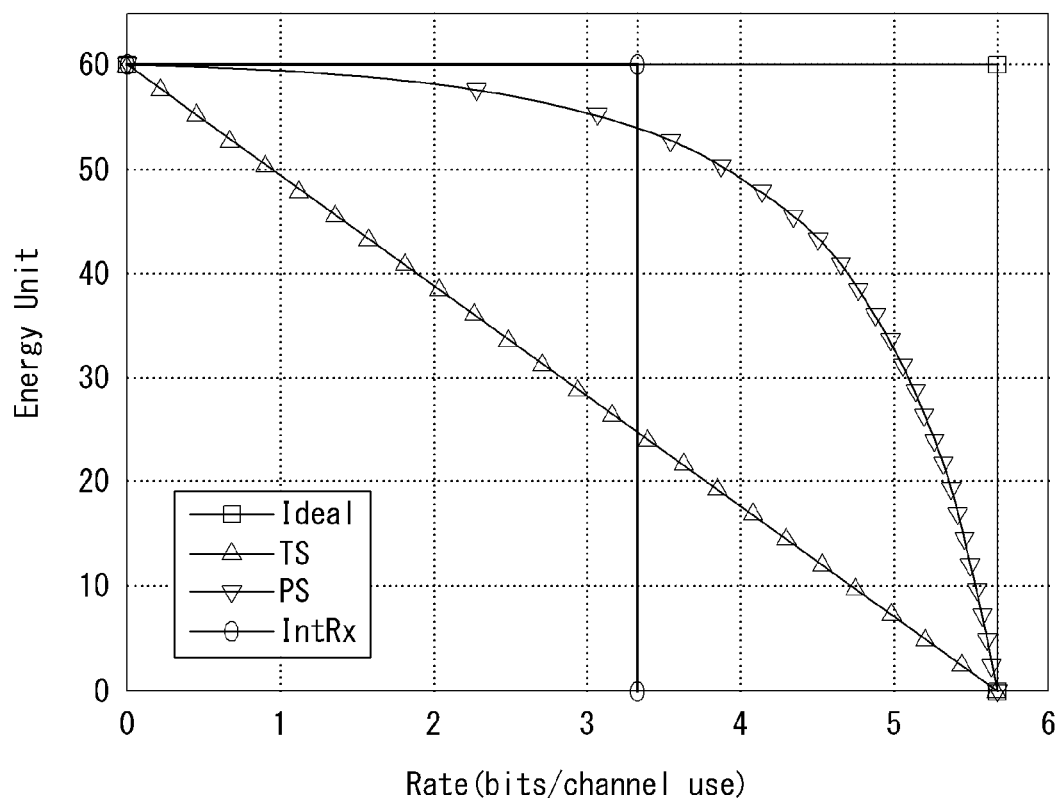

[FIG. 3]
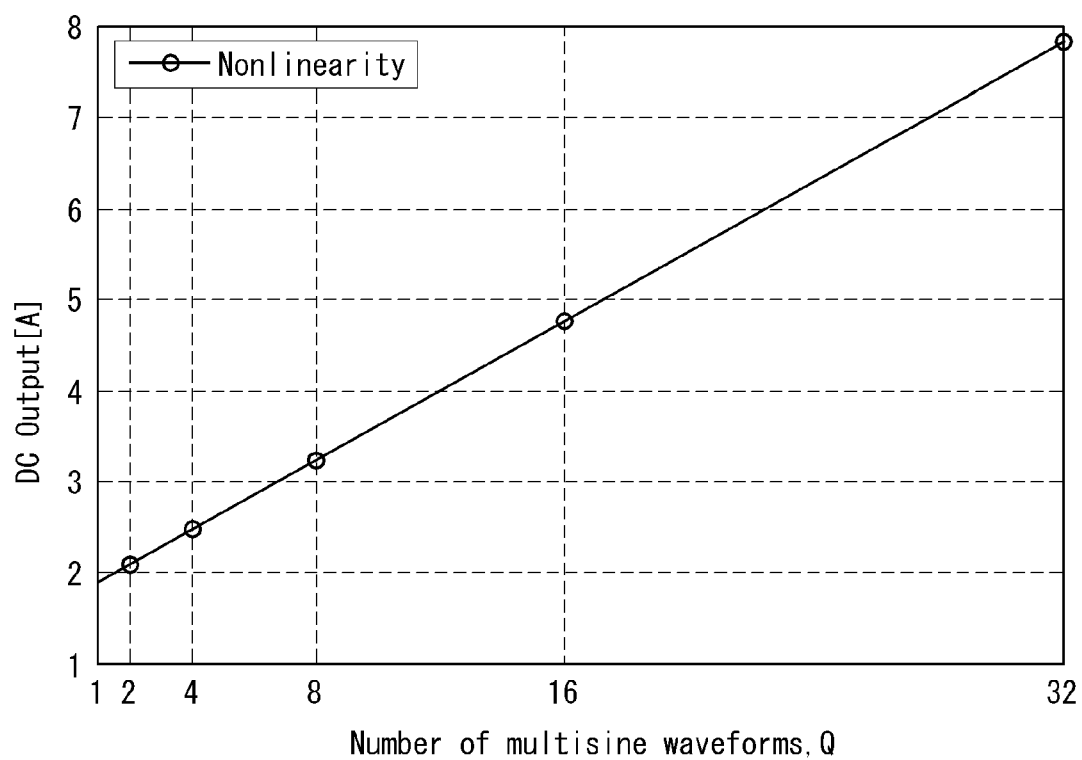

[FIG. 4]
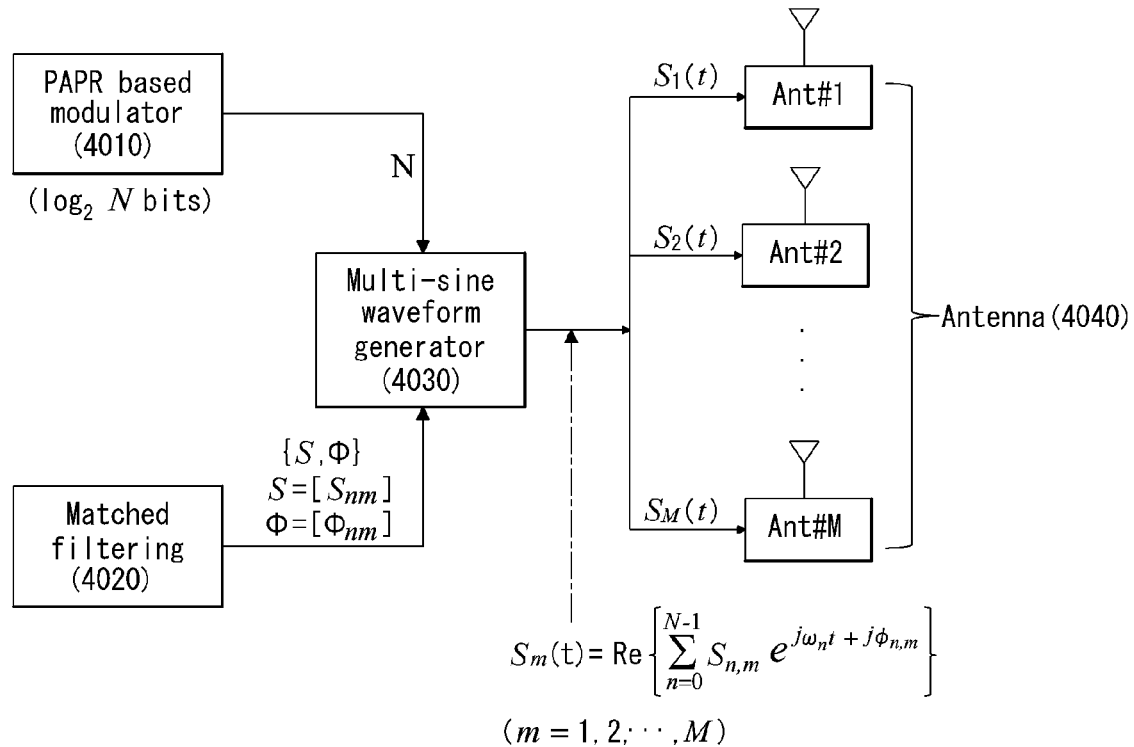
[FIG. 5]
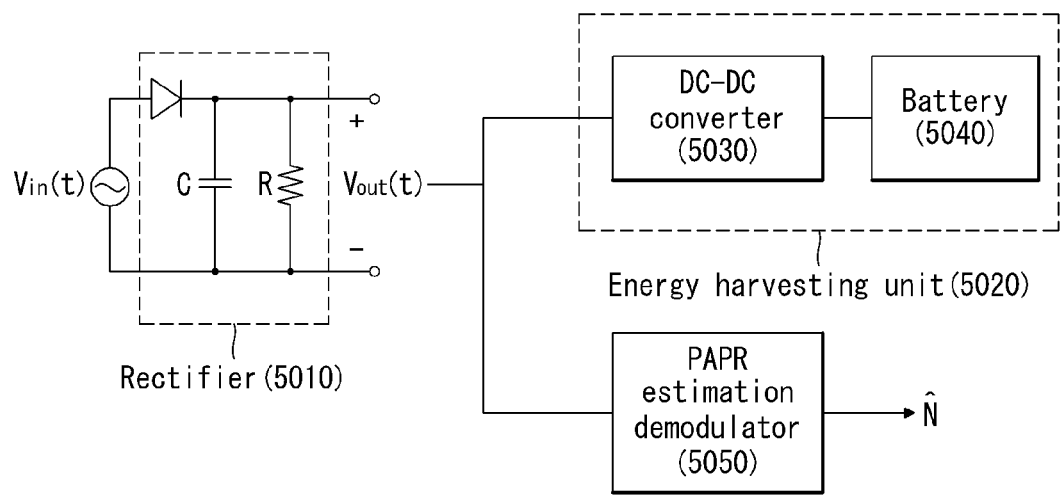

[FIG. 6]
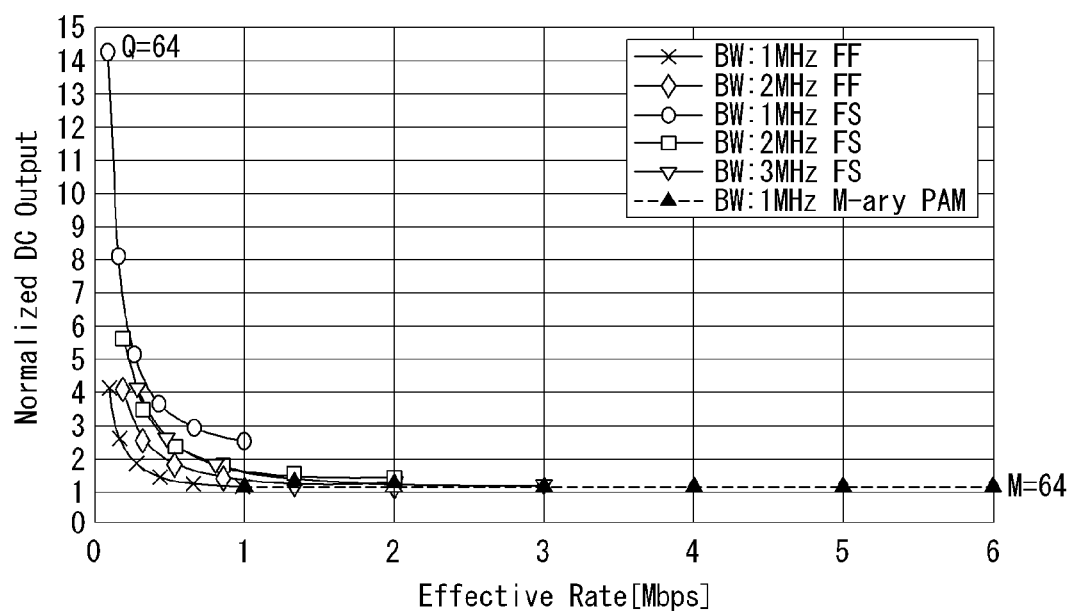

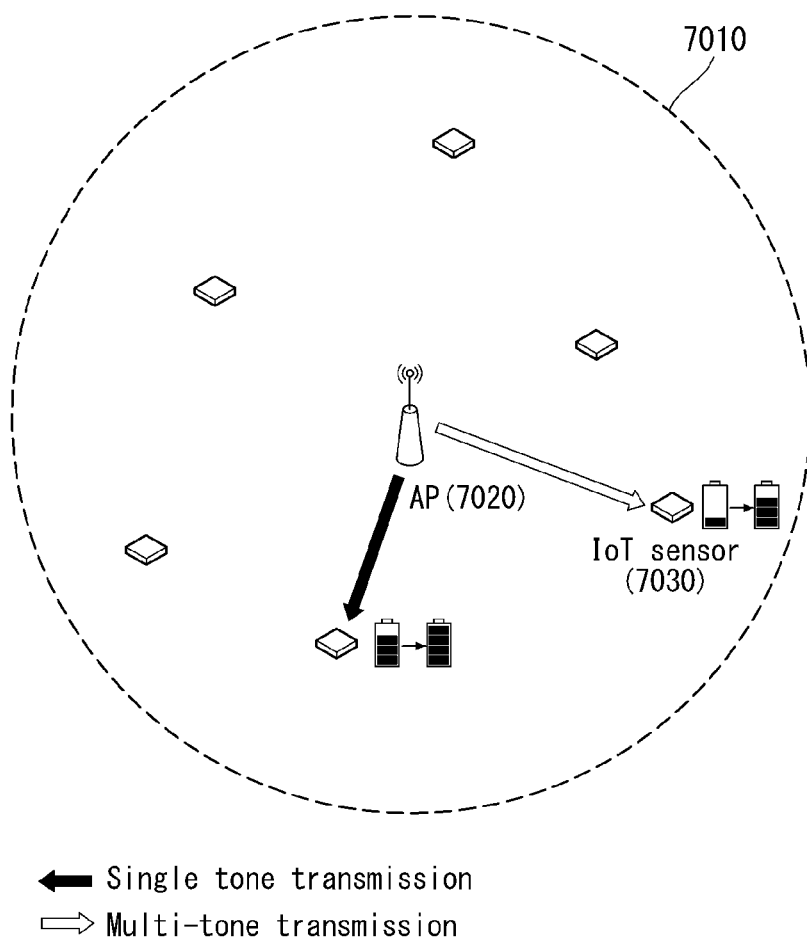
[FIG. 7]

[FIG. 8]
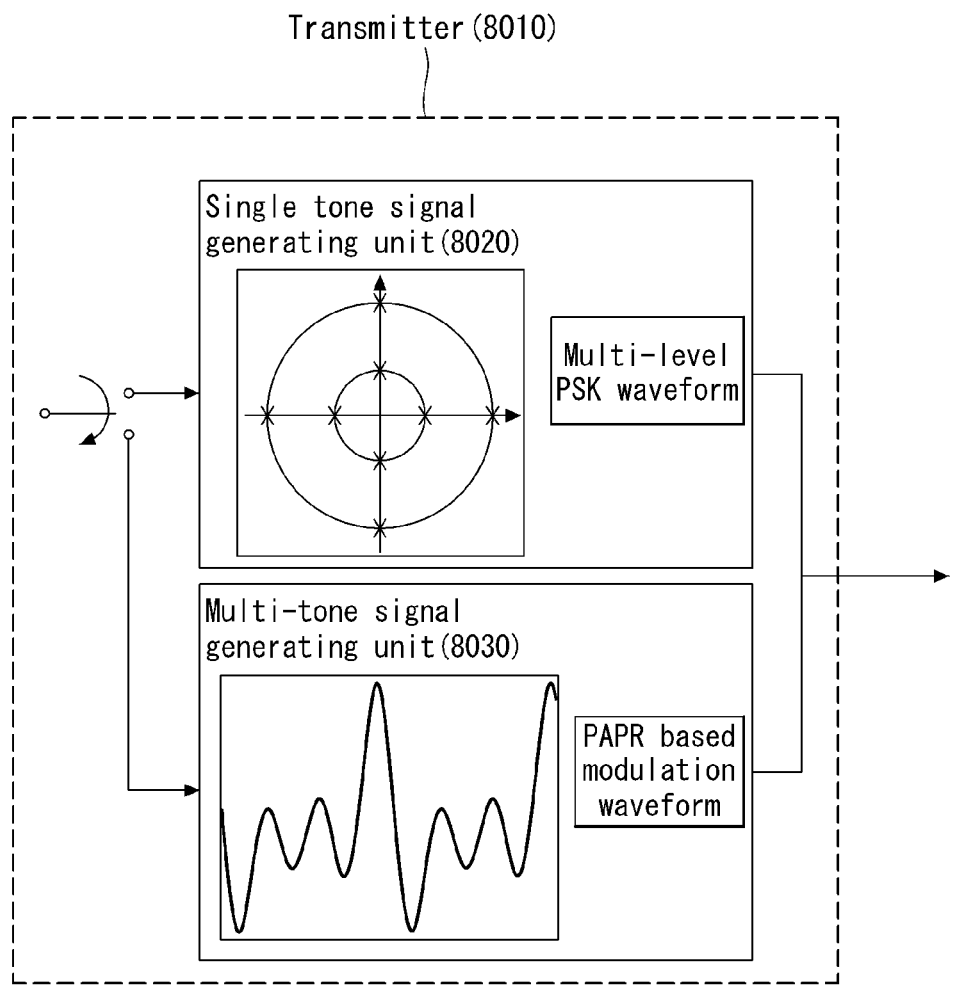

[FIG. 10]
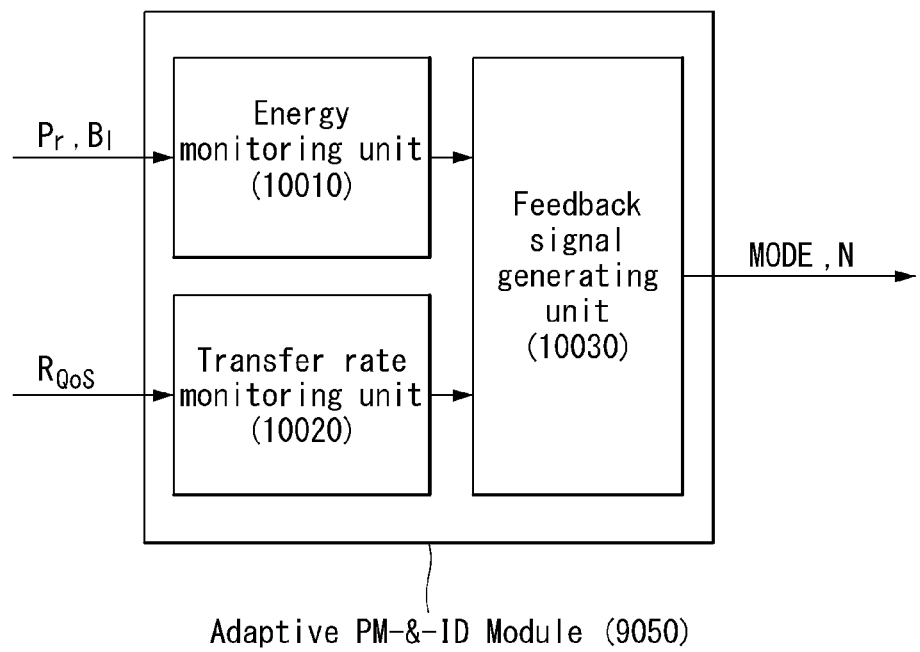

[FIG. 11]
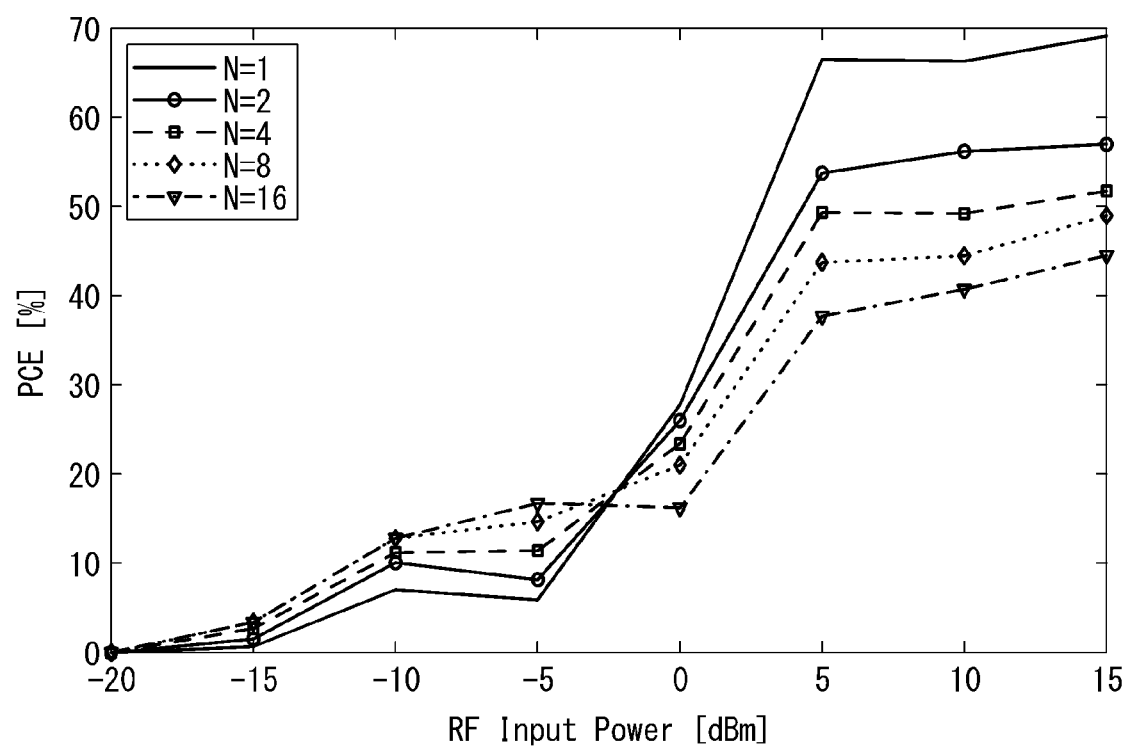

[FIG. 12]
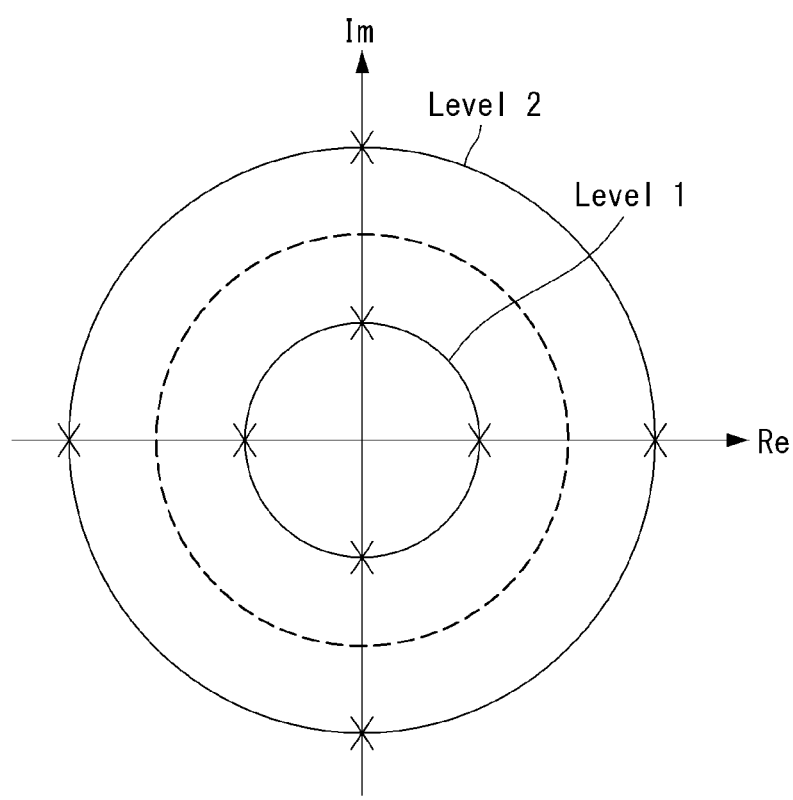

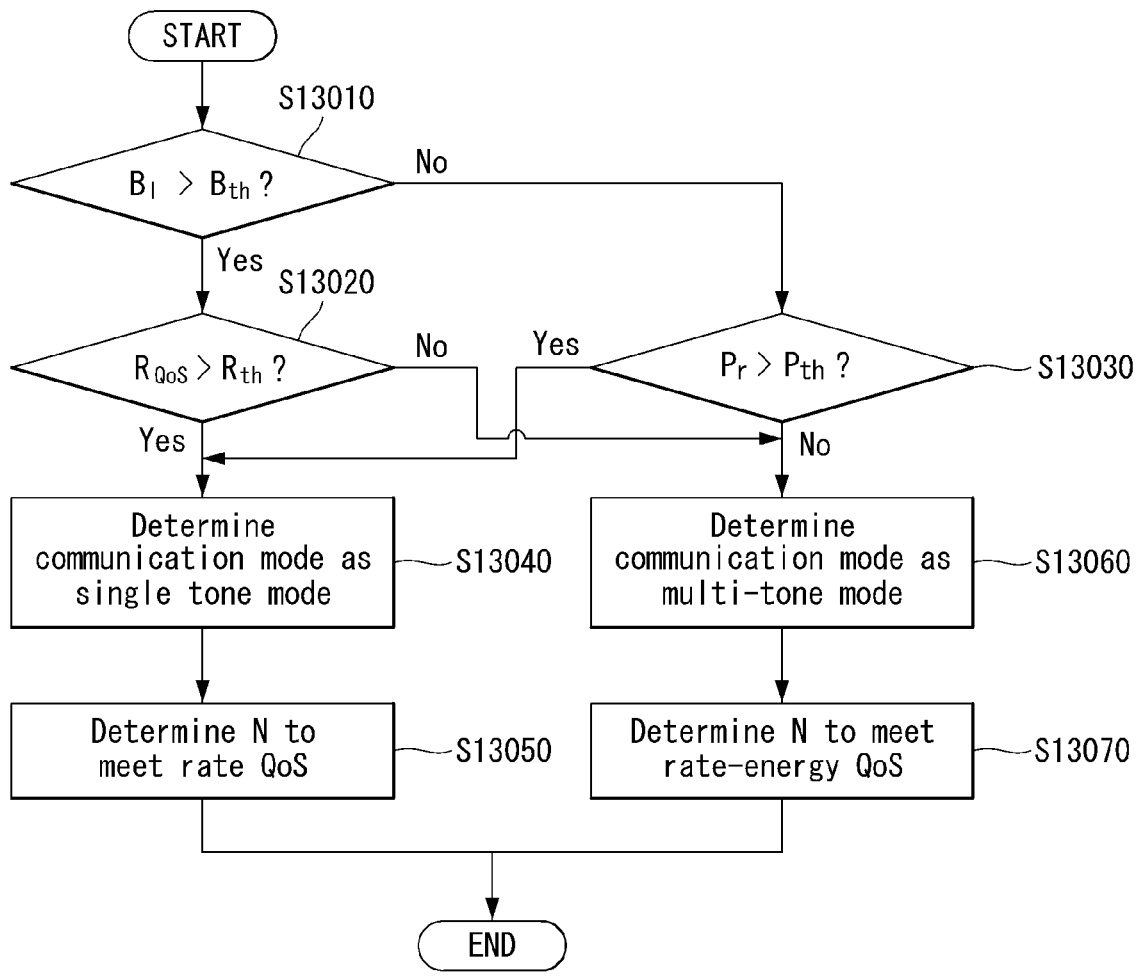
[FIG. 13]

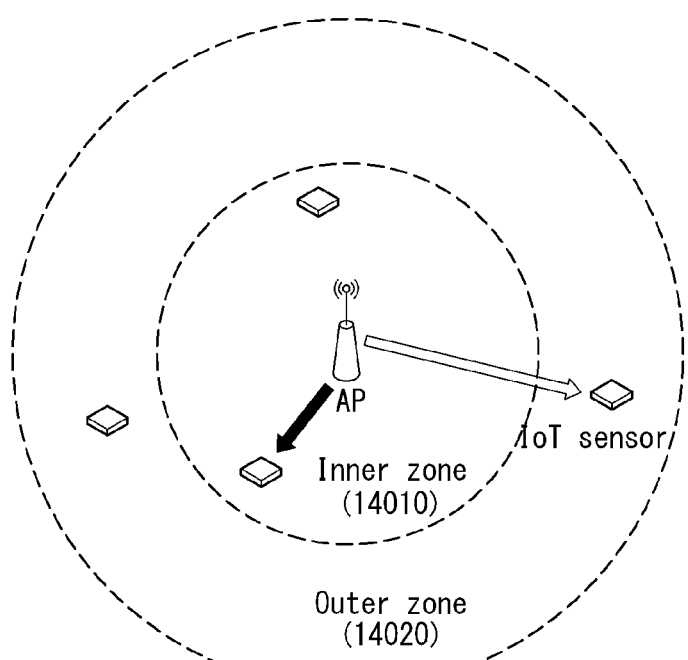

[FIG. 15]
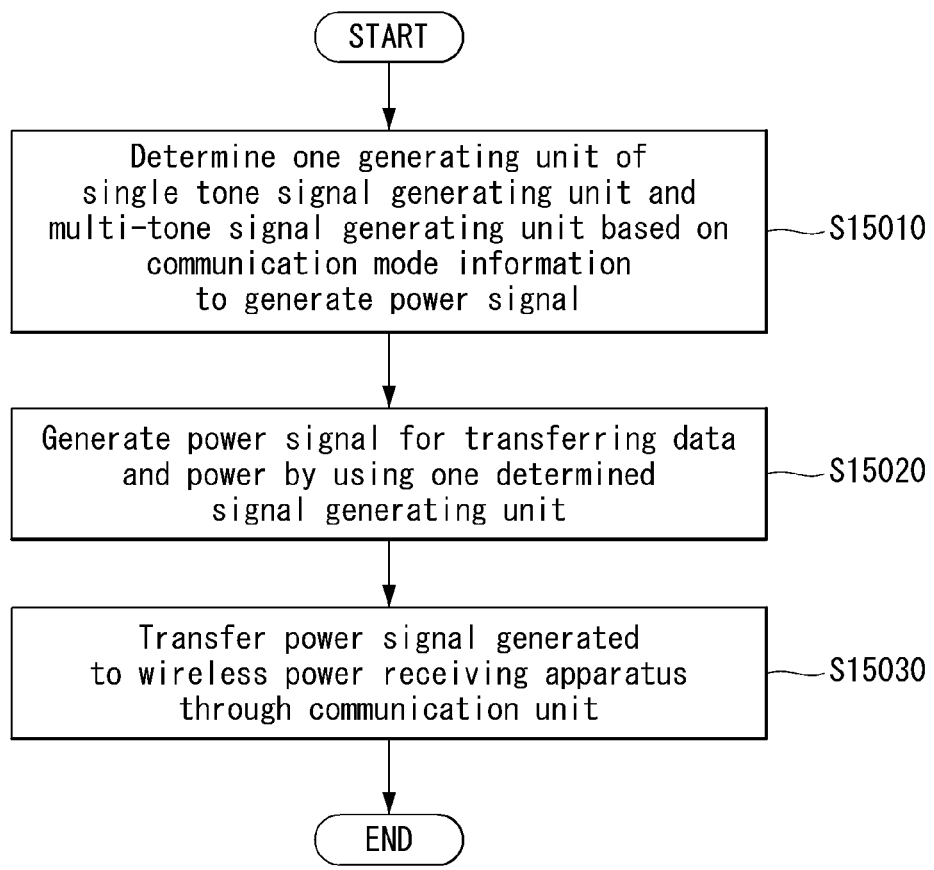

[FIG. 16]
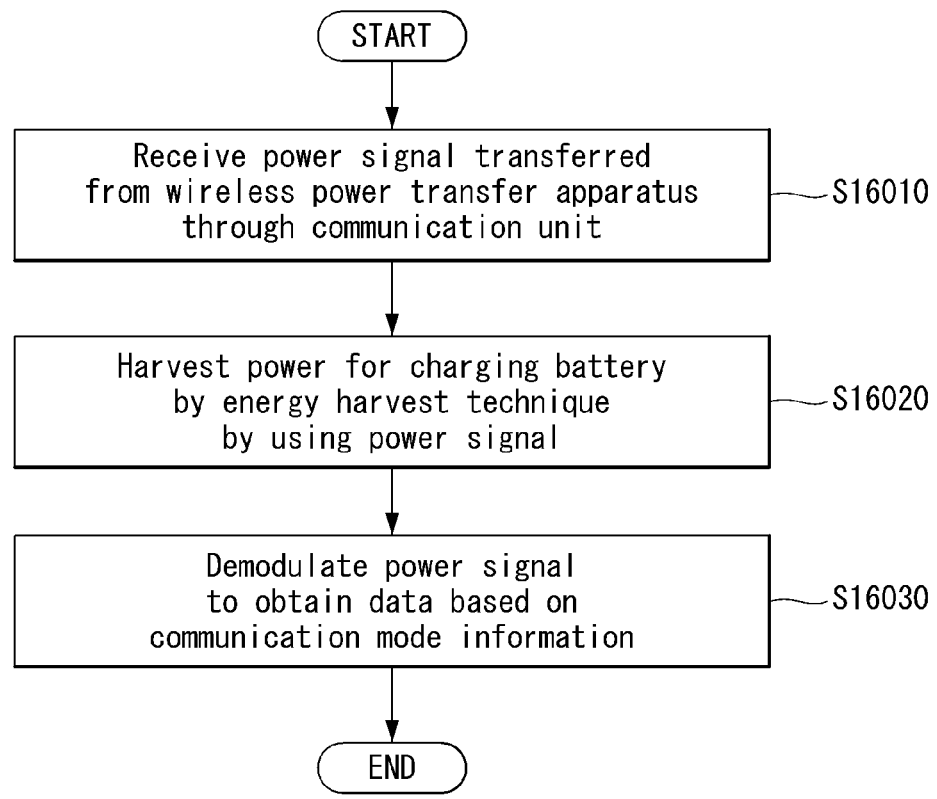

WIRELESS POWER TRANSFER APPARATUS, WIRELESS POWER RECEIVING APPARATUS, WIRELESS POWER TRANSFER METHOD, WIRELESS POWER RECEIVING METHOD, WIRELESS POWER TRANSFER SYSTEM USING DUAL MODE AND RECORDING MEDIUM THEREOF

CROSS-REFERENCE TO RELATED APPLICATION

Pursuant to 35 U.S.C. § 119(a), this application claims the benefit of earlier filing date and right of priority to Korean Patent Application No. 10-2017-0121387, filed on Sep. 20, 2017, the contents of which are incorporated by reference herein in their entirety.

BACKGROUND OF THE INVENTION

Field of the Invention

The present invention relates to a wireless power transfer apparatus, a wireless power receiving apparatus, a wireless power transfer system, and a wireless power transfer method, and more particularly, to a wireless power transfer apparatus, a wireless power receiving apparatus, a wireless power transfer system, and a wireless power transfer method simultaneously transferring/receiving power and information wirelessly by using a dual mode.

Related Art

Simultaneous wireless information and power transfer (SWIPT) technology is technology that simultaneously transfers information and power wirelessly. A wireless power receiving apparatus (receiver) may collect power transferred from a wireless power transfer apparatus (transmitter) by a SWIPT technique by an energy harvesting technique.

Internet of things (IoT) refers to technology that embeds a sensor and a communication function in various things and connects various things to the Internet. Here, the things refer to various embedded systems such as household appliances, mobile equipment, or wearable devices. In recent years, the number of IoT sensors connected to the Internet has been surging to utilize an IoT service. In low-end machine-to-machine (M2M) IoT communication, the IoT sensors generally have limitations on power supply methods such as battery replacement and power cord connection. Therefore, self-powering, in which the IoT sensor itself receives energy and a low power operation of the sensor for the self-powering are important.

SUMMARY OF THE INVENTION

As a SWIPT technique for simultaneously transferring information and power, there is a single tone based SWIPT scheme and a PAPR based SWIPT scheme.

In the single tone based SWIPT scheme, the information and the power are simultaneously transferred wirelessly by using a signal having a single tone. Since the single tone based SWIPT uses an I/Q modulation technique, a lot of power is consumed in obtaining the information. In addition, since the single tone based SWIPT has lower wireless power transfer efficiency than a case of using a multi-tone signal, energy coverage is not relatively wide.

Unlike the I/Q modulation technique, in the peak-to-average power ratio (PAPR) based SWIPT scheme, the information is obtained through simple PAPR measurement. Since the PAPR based SWIPT uses a receiver having low complexity, energy consumption used in the receiver is small. However, the PAPR based SWIPT has a low transfer rate due to a nonlinear characteristics of a rectifier of the receiver.

The present invention provides a wireless power transfer apparatus, a wireless power receiving apparatus, a wireless power transfer system, and a wireless power transfer method that transfer/receive the information and the power wirelessly in a dual mode based on an adaptive power management-&-information decoding (PM-&-ID) policy in order to solve problems of the single tone based SWIPT scheme and the PAPR based SWIPT scheme.

In an aspect, a wireless power transfer apparatus transferring data and power to a wireless power receiving apparatus by using a power signal is provided. The wireless power transfer apparatus includes a signal generating unit generating the power signal for transferring the data and the power; a communication unit transferring the power signal generated by the signal generating unit to the wireless power receiving apparatus and communicating with the outside; and a control unit controlling the signal generating unit and the communication unit, in which the signal generating unit generates the power signal according to one communication mode of a single tone transmission mode and a multi-tone transmission mode based on communication mode information transferred from the wireless power receiving apparatus through the communication unit, and the single tone transmission mode and the multi-tone transmission mode use different modulation schemes respectively.

The signal generating unit may include a single tone signal generating unit generating a single tone signal when the communication mode information indicates the single tone transmission mode, and a multi-tone signal generating unit generating a multi-tone signal when the communication mode information indicates the multi-tone transmission mode, and the single tone signal as a single-frequency sinusoidal signal is a signal modulated in a phase-shift keying scheme with multi-level and the multi-tone signal as a multi-frequency sinusoidal signal is a signal modulated in a peak-to-average power ratio scheme.

The signal generating unit may selectively switch one generator to generate the power signal of the single tone signal generating unit and the multi-tone signal generating unit based on the communication mode information transferred from the wireless power receiving apparatus, and the communication mode information is generated by the wireless power receiving apparatus and fed back to the wireless power transfer apparatus.

When the communication mode is the single tone transmission mode, the signal generating unit may generate the single tone signal based on a first modulation index included in the communication mode information, and the first modulation index may represent the number of combinations of an energy level and and phase of the single tone signal in order to meet a required transfer rate of the power signal.

When the communication mode is the multi-tone transmission mode, the signal generating unit may generate the multi-tone signal having a number of subcarriers corresponding to a second modulation index included in the communication mode information, and the second modulation index may represent the number of subcarriers for meeting the required transfer rate of the power signal and a required battery charge amount of the wireless power receiving apparatus.

The communication unit may be connected with multi-antennas or multi-rectennas and the power signal is transferred to the wireless power receiving apparatus through the multi-antennas or the multi-rectennas.

In another aspect, a wireless power receiving apparatus obtaining data and power by using a power signal transferred from a wireless power transfer apparatus is provided. The wireless power receiving apparatus includes a communication unit receiving the power signal transferred from the wireless power transfer apparatus and communicating with the outside; a power harvesting unit harvesting power for charging a battery of the wireless power receiving apparatus from the power signal by using an energy harvesting technique; a mode determination unit determining one communication mode of a single tone mode using a single tone signal and a multi-tone mode using a multi-tone signal as the power signal for communication with the wireless power transfer apparatus; and a signal processing unit demodulating the power signal according to the communication mode determined by the mode determination unit to obtain data, in which the single tone signal is a single-frequency sinusoidal signal, the multi-tone signal is a multi-frequency sinusoidal signal, and the single tone mode and the multi-tone mode use different modulation schemes respectively, and the mode determination unit determines one communication mode based on received power of the power signal, a required transfer rate of the power signal required by the wireless power receiving apparatus, and a state of the battery.

The mode determination unit may determine the communication mode by periodically monitoring the state of the battery, the received power, and the required transfer rate, and information of the determined communication mode may be fed back to the signal processing unit and the wireless power transfer apparatus.

The power signal may be generated by the wireless power transfer apparatus based on the communication mode information which is fed back.

The single tone signal may be a signal modulated in a phase-shift keying scheme with multi-level and the multi-tone signal may be a signal modulated in a peak-to-average power ratio scheme.

The signal processing unit may include a single tone signal processing unit including a phase detector detecting a phase of a signal, an energy level detector detecting an energy level of the signal, and a first decoder, and a multi-tone signal processing unit including an envelope detector detecting an envelope of the signal, a PAPR estimator obtaining a PAPR of the signal, and a second decoder, and the received power signal may be processed by the single tone signal processing unit when the communication mode determined by the mode determination unit is a single tone receive mode and the received power signal may be processed by the multi-tone signal processing unit when the communication mode is a multiple tone receive mode.

The signal processing unit may use one of the single tone signal processing unit and the multi-tone signal processing unit based on the communication mode information fed back by the mode determination unit.

The power harvesting unit may include a rectifier converting the power signal which is a sinusoidal signal into a DC signal, a DC-DC converter transforming voltage of the DC signal output from the rectifier in order to charge the battery of the wireless power receiving apparatus, and a battery charged by using the transformed DC signal output from the DC-DC converter, and the power harvesting unit may harvest the power from the power signal regardless of a type of the communication mode, and when the communication mode is the single tone receive mode, the DC signal output from the rectifier may be transmitted to the signal processing unit and used for determining the energy level of the power signal.

When the communication mode is the single tone receive mode, the energy level of the power signal may be determined by using the DC signal output from the rectifier.

The mode determination unit may include an energy monitoring unit obtaining state information of the battery and the received power information, a transfer monitoring unit obtaining the required transfer rate by monitoring the wireless power receiving apparatus, and a feedback signal generating unit determining the communication mode based on the information obtained by the energy monitoring unit and the transfer rate monitoring unit and generating a feedback signal including the information of the determined communication mode, when the communication mode is the single tone mode, the feedback signal generating unit may determine a first modulation index representing the number of combinations of the energy level and a phase of the power signal for meeting the required transfer rate, when the communication mode is the multi-tone mode, the feedback signal generating unit may determine a second modulation index related to the number of subcarriers of the power signal for meeting a required battery charge amount and the required transfer rate, and the information of the first modulation index or the information of the second modulation index may be included in the feedback signal.

The mode determination unit may determine the communication mode as the single tone receive mode when the remaining battery capacity is larger than a first threshold value and the required transfer rate is larger than a second threshold value, or, when the remaining battery capacity is equal to or smaller than the first threshold value and the received power is larger than a third threshold value, and the mode determination unit may determine the communication mode as the multi-tone receive mode when the remaining battery capacity is larger than the first threshold value and the required transfer rate is equal to or smaller than the second threshold value or when the remaining battery capacity is equal to or smaller than the first threshold value and the received power is equal to or smaller than the third threshold value.

The mode determination unit may determine the communication mode as the single tone receive mode when the power of the received power signal is equal to or higher than −3 dBm and determine the communication mode as the multiple tone receive mode when the power of the received power signal is less than −3 dBm.

In yet another aspect, a wireless power receiving method receiving, by a wireless power receiving apparatus, data and power by using a power signal transferred from a wireless power transfer apparatus by using a power signal is provided. The method performed by the wireless power receiving apparatus includes receiving the power signal transferred from the wireless power transfer apparatus through a communication unit; harvesting power for charging a battery by an energy harvesting technique by using the power signal; and demodulating the power signal in order to obtain the data based on communication mode information, in which the power signal corresponds to a single tone signal which is a single-frequency sinusoidal signal or a multi-tone signal which is a multi-frequency sinusoidal signal generated by the wireless power transfer apparatus, the wireless power receiving apparatus demodulates the power signal by using different demodulation schemes according to the communication mode information, and the communication mode information corresponds to information which is determined based on a state of the battery, received power of the power signal, and a required transfer rate of the wireless power receiving apparatus and fed back by the wireless power receiving apparatus.

The demodulating of the power signal may further include demodulating the power signal by using one of a single tone signal processing unit processing the single tone signal and a multi-tone signal processing unit processing the multi-tone signal in order to obtain the data based on the communication mode information, and the communication mode information may include one communication mode information either a single tone mode using the single tone signal processing unit or a multi-tone mode using the multi-tone signal processing unit.

The method may further include determining one communication mode of the single tone mode using the single tone signal and the multi-tone mode using the multi-tone signal based on the state of the battery, the received power of the power signal, and the required transfer rate of the power signal required by the wireless power receiving apparatus; and feeding back the determined communication mode information to the wireless power transfer apparatus and the wireless power receiving apparatus.

BRIEF DESCRIPTION OF THE DRAWINGS

FIG. 1 is an internal block diagram of a time-switching SWIPT receiver and a power-splitting SWIPT receiver according to an embodiment of the present invention.

FIG. 2 is a graph illustrating a tradeoff between a signal transfer rate and energy efficiency of a receiver depending on a type of a SWIPT technique according to an embodiment of the present invention.

FIG. 3 is a graph illustrating nonlinearity of power transfer efficiency due to a rectifier included in the receiver according to an embodiment of the present invention.

FIG. 4 illustrates signal generation and transfer processes of a PAPR based SWIPT transfer unit according to an embodiment of the present invention.

FIG. 5 illustrates a signal processing process of the PAPR based SWIPT receiving unit according to an embodiment of the present invention.

FIG. 6 illustrates a tradeoff between the signal transfer rate and power transfer efficiency depending on the number of tones used in the PAPR based SWIPT according to an embodiment of the present invention.

FIG. 7 illustrates a method of transferring a signal to a service area of a dual mode SWIPT and sensors in the service area according to an embodiment of the present invention.

FIG. 8 is an internal block diagram of a transmitter according to an embodiment of the present invention.

FIG. 10 is an internal block diagram of an adaptive PM-&-ID module according to an embodiment of the present invention.

FIG. 11 illustrates power conversion efficiency of a multi-tone transmission mode depending on received power and the number of tones according to an embodiment of the present invention.

FIG. 12 is a constellation diagram of a single tone signal depending on an energy level according to an embodiment of the present invention.

FIG. 13 is a flowchart illustrating a process of determining a communication mode and a modulation index according to an embodiment of the present invention.

FIG. 14 illustrates a service area divided in a dual mode SWIPT scheme and a signal transfer scheme depending on an area according to an embodiment of the present invention.

FIG. 15 is a flowchart of a wireless power transfer method performed by a wireless power transfer apparatus according to an embodiment of the present invention.

FIG. 16 is a flowchart of a wireless power receiving method performed by a wireless power receiving apparatus according to an embodiment of the present invention.

DESCRIPTION OF EXEMPLARY EMBODIMENTS

Figure 9:
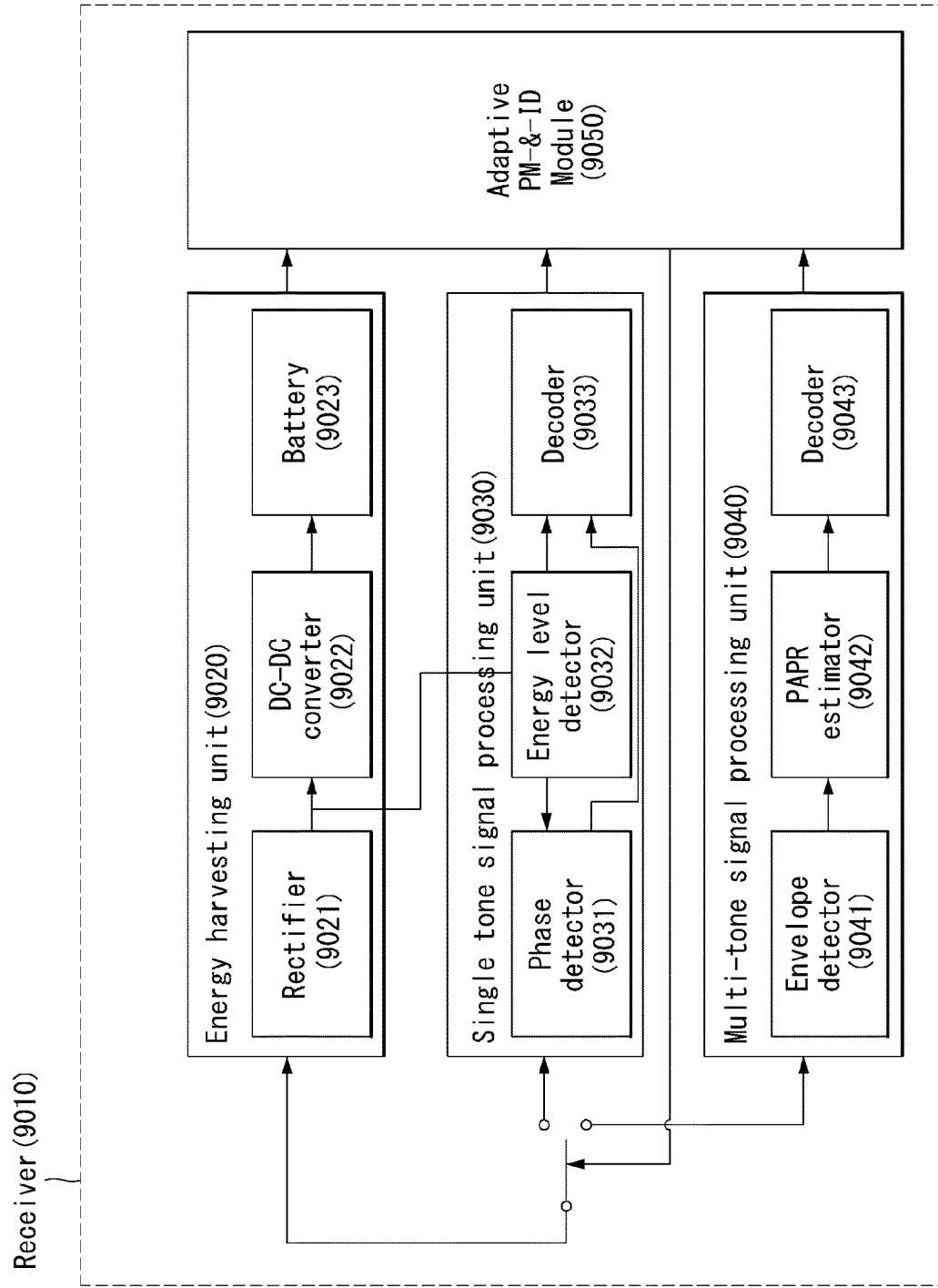
FIG. 9 is an internal block diagram of a receiver according to an embodiment of the present invention.

In order to help understanding of the present invention, the accompanying drawings which are included as a part of the Detailed Description provide embodiments of the present invention and describe the technical features of the present invention together with the Detailed Description. Like reference numerals principally designate like elements throughout the specification. Further, in describing the present invention, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Hereinafter, a method and an apparatus related with the present invention will be described in more detail with reference to drawings. In addition, a general term used in the present invention should be interpreted as defined in a dictionary or contextually, and should not be interpreted as an excessively reduced meaning. Further, a singular form used in the present specification may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first," "second,", and the like are used to differentiate a certain component from other components, but the scope of should not be construed to be limited by the terms.

In the present specification, a transmitter refers to a device capable of wirelessly transferring power together with information to a receiver simultaneously using one signal. The transmitter may be referred to as an AP, a wireless power transfer apparatus, a wireless power supply apparatus, or the like. As an example, the transmitter may correspond to an Access Point (AP) of an IoT platform. One transmitter may independently supply the power each of one or more receivers using a radio frequency (RF) signal.

In the present specification, a receiver refers to a device capable of autonomously supplying energy by obtaining information and power from the signal wirelessly transmitted from the transmitter. The receiver may be referred to as a sensor or a wireless power receiving apparatus. As an example, the receiver may correspond to an IoT sensor of the IoT platform.

FIG. 1 is an internal block diagram of a time-switching SWIPT receiver and a power-splitting SWIPT receiver according to an embodiment of the present invention.

In a SWIPT scheme (single tone based SWIPT, hereinafter, referred to as a 'single tone transfer technique' or a 'single tone transfer scheme') that transfers information and power wirelessly by using a single tone signal, the information and energy are transferred by using a radio frequency (RF) signal. The single tone signal is a sinusoidal signal having a single frequency. An operation scheme of a single tone transfer technique in a receiver includes a time-switching (TS) scheme and a power-splitting (PS) scheme. The time-switching scheme may be referred to as a TS scheme and the power-splitting scheme may be referred to as a PS technique.

FIG. 1(a) is an internal block diagram of a time-switching SWIPT receiver (hereinafter, referred to as a TS receiver) 1010 using a time-switching scheme to harvest the information and the energy from a received signal and FIG. 1(b) is an internal block diagram of a power-splitting SWIPT receiver (hereinafter, referred to as a PS receiver) 1060 using a power splitting scheme. In FIG. 1, 'first' and 'second' are used for distinguishing devices.

The time splitting scheme sequentially obtains the energy and the information by splitting a time. Referring to FIG. 1(a), the TS receiver 1010 includes a first antenna 1020, a time switcher 1030, a first energy harvesting (EH) unit 1040, and a first information obtaining unit 1050. The first antenna 1020 receives the signal transferred from the transmitter. The time switcher 1030 transfers the signal received through the first antenna 1020 to the first energy harvesting unit 1040 or the first information obtaining unit 1050 according to the split time. As an example, the time switcher 1030 harvests the energy by transferring the signal received by the first energy harvesting unit 1040 for a time t and transfers the signal received by the first information obtaining unit 1050 for a next time t to obtain data. Therefore, the energy and the information may be sequentially obtained.

In the power splitting scheme, the power of the received signal is split to use a signal having a part of the received power for harvesting the energy and use a remaining signal for obtaining the information. Referring to FIG. 1(b), the PS receiver 1060 includes a second antenna 1070, a power splitter 1080, a second energy harvesting unit 1090, and a second information obtaining unit 1100. The second antenna 1070 receives the signal transmitted from the transmitter. The power splitter 1080 splits the power of the signal received through the second antenna 1070 and transfers two signals having the split power to the second energy harvesting unit 1090 and the second information obtaining unit 1100, respectively. As an example, the power splitter 1080 may transmit two signals having 50% power of the received signal power to the second energy harvesting unit 1090 and the second information obtaining unit 1100, respectively. The second energy harvesting unit 1090 and the second information obtaining unit 1100 obtain the energy and the information using the received signals, respectively.

FIG. 2 is a graph illustrating a tradeoff between a signal transfer rate and energy efficiency of a receiver depending on a type of a SWIPT technique according to an embodiment of the present invention.

FIG. 2 illustrates a rate-energy tradeoff of the TS technique and the PS technique. The rate-energy tradeoff represents that energy efficiency of the receiver decreases as a transfer rate of the signal increases.

In the TS technique, it is simple to implement a circuit of the receiver, but the TS technique has a relatively low rate-energy tradeoff. In the PS technique, it is simple to implement the circuit of the receiver, but the PS technique has a relatively high rate-energy tradeoff. Referring to FIG. 2, it can be seen that the PS technique exhibits higher energy efficiency (y axis) at the same signal transfer rate (x axis).

The single tone based SWIPT basically adopts an in-phase/quadrature (I/Q) modulation scheme based on orthogonality of a channel. Since the single tone based SWIPT splits and uses time and power resources, there is a limitation in efficient use of resources in simultaneous transfer of the information and the energy. In the single tone based SWIPT, the transmitter transfers the signal by modulating an amplitude and a phase of the single tone signal. The TS/PS receiver obtains the information by demodulating the amplitude and the phase of the received signal.

In the single tone based SWIPT, since the transmitter modulates the signal by using the amplitude and the phase, the single tone based SWIPT has a relatively high transfer rate. However, in the single tone based SWIPT, the receiver consumes a lot of energy in the process of obtaining the information by demodulating the amplitude and the phase from the received signal.

FIG. 3 is a graph illustrating nonlinearity of power transfer efficiency due to a rectifier included in the receiver according to an embodiment of the present invention.

The rectifier is included in the receiver and converts an input RF signal into a DC signal. The DC signal is used to charge the battery of the receiver.

FIG. 3 illustrates nonlinearity of the rectifier at low power. Referring to FIG. 3, it can be seen that a magnitude (y axis) of an output DC signal increases by approximately two times from 2 to less than 5 while the number (x axis) of multi-sine waveforms increases by approximately 8 times from 2 to 16 in an input signal.

Due to the nonlinearity of the rectifier at such low power, the single tone based SWIPT does not have optimal efficiency in wireless power transfer. The PAPR based SWIPT scheme using the multi-tone signal is proposed in order to enhance wireless power transfer efficiency. Details of the PAPR based SWIPT scheme will be described below.

FIG. 4 illustrates signal generation and transfer processes of a PAPR based SWIPT transfer unit according to an embodiment of the present invention.

The PAPR based SWIPT (PAPR based SWIPT, hereinafter, referred to as a 'PAPR transfer scheme' or a 'PAPR transfer technique') transfers the information and the energy by using the multi-tone signal. The multi-tone signal is a multi-frequency sinusoidal signal. The PAPR based SWIPT transmits the information by using a peak-to-average power ratio (hereinafter, referred to as 'PAPR') and increases efficiency of wireless power transfer by using multiple tones.

Specifically, unlike the I/Q modulation scheme, the PAPR based SWIPT transfers the information using a characteristic in which the PAPR of the multiple tones varies depending on the number of subcarriers of the signal. In the PAPR based SWIPT, the receiver obtains the information by using the PAPR obtained in a DC output of an energy harvest circuit unlike the single tone based SWIPT.

Referring to FIG. 4, the transmitter of the PAPR based SWIPT includes a PAPR based modulator 4010, a matched filtering unit 4020, a multi-sine waveform generator 4030, and a plurality of antennas 4040. Outputs of the PAPR based modulator 4010 and the matched filtering unit 4020 are input into the multi-sine waveform generator 4030. Then, the multi-tone signal generated by the multi-sine waveform generator 4030 is transferred through the plurality of antennas 4040.

FIG. 5 illustrates a signal processing process of the PAPR based SWIPT receiving unit according to an embodiment of the present invention.

The wireless power transfer efficiency is affected by the nonlinear characteristic of the rectifier included in the receiver (see FIGS. 2 and 3). Therefore, since the transfer scheme using the multi-tone signal uses the multi-tone signal, the transfer scheme using the multi-tone signal has higher wireless power transfer efficiency than the scheme using the single-tone signal. Further, the transfer scheme using the multi-tone signal has wider energy coverage than the single-tone transfer scheme due to high wireless power transfer efficiency.

Referring to FIG. 5, the PAPR based SWIPT receiver includes a rectifier 5010, an energy harvesting unit 5020, and a PAPR estimation demodulator 5050. The energy harvesting unit 5020 includes a DC-DC converter 5030 and a battery 5040.

The rectifier 5010 outputs the DC signal by rectifying the input multi-tone signal. The DC signal output from the rectifier 5010 is input into the energy harvesting unit 5020 and the PAPR estimation demodulator 5050. The DC-DC converter 5030 transforms and outputs the voltage of the DC signal input to charge the battery. The battery 5040 is charged using the output of the DC-DC converter. The PAPR estimation demodulator 5050 obtains the information using the PAPR of the signal output from the rectifier 5010. As an example, the PAPR estimation demodulator may measure the PAPR using Equation 1 below.

$$PAPR_{RX} = \frac{\max_{t \in [0,T]} V_{out}(t)^2}{\frac{1}{T}\int_T V_{out}(t)^2 dt}$$ [Equation 1]

The receiver of the single tone based SWIPT using the I/O modulation technique performs mixer, ADC, and channel estimation in the process of obtaining the information to consume a lot of energy. However, unlike the I/Q modulation scheme, since the receiver of the PAPR based SWIPT obtains the information through simple PAPR measurement, the receiver consumes less energy. Further, since the amplitude and the phase of the subcarriers are aligned through a matched filter of the transmitter, the receiver may obtain the information without additional channel estimation. That is, the PAPR based SWIPT uses a receiver having lower complexity than the single tone based SWIPT and may obtain the information by consuming less energy.

FIG. 6 illustrates a tradeoff between the signal transfer rate and power transfer efficiency depending on the number of tones used in the PAPR based SWIPT according to an embodiment of the present invention.

Since the PAPR based SWIPT uses a modulation/demodulation technique having lower complexity than the single tone based SWIPT, the information may be obtained at low power. However, the PAPR based SWIPT has the tradeoff between wireless power transfer efficiency and transmission rate as the number of tones increases. Referring to FIG. 6, it can be seen that a high DC output (y axis) is exhibited in an area where the transfer rate (x axis) of the signal is low.

In the PAPR based SWIPT, as the number of tones of the signal increases, the wireless power transfer efficiency is enhanced and the transfer rate decreases. This is caused due to the nonlinear characteristic of the rectifier included in the receiver. The PAPR based SWIPT increases the number of tones to expand the energy coverage and the transfer rate decreases as the number of tones increases.

FIG. 7 illustrates a method of transferring a signal to a service area of a dual mode SWIPT and sensors in the service area according to an embodiment of the present invention.

A dual mode SWIPT scheme (hereinafter referred to as the present invention) proposed by the present specification can solve a problem of the limited energy coverage of the single tone transfer scheme and the problem of the low transfer rate of the PAPR transfer scheme.

Within a service area 7010, one or more wireless power receiving apparatuses (receivers) may be distributed around one wireless power transfer apparatus (transmitter). The service area 7010 corresponds to an area where one wireless power transfer apparatus may transfer the information and the energy using the signal. The receivers positioned within the service area 7010 may receive the signals transmitted from the transmitter.

In FIG. 7, an access point (AP) 7020 corresponds to the wireless power transfer apparatus, and an IoT sensor 7030 (hereinafter referred to as a sensor) corresponds to the wireless power receiving apparatus. Unlike the AP, the sensors may not be supplied with sufficient power due to characteristics of the sensor itself or an internal/external environment. Particularly, since a large number of sensors exist in a low-end machine-to-machine (M2M) IoT communication environment, it is difficult to supply and manage the energy. Therefore, self-powering in which the sensor autonomously supplies the energy is important. The receivers harvest the energy required for the self-powering. For the self-powering, a low-power operation of the receiver in the sensor is required.

The sensor positioned within the service area 7010 may receive the signal from the AP and obtain the information and the energy using the received signal. In this case, a remaining capacity of the battery of the sensor may be sufficient or insufficient. The remaining capacity of the battery means extract power of the battery.

In the present invention, a rate-energy quality of service (QoS) between a required transfer rate and a harvested energy varies depending on the state of the battery of the receiver. The receiver with a sufficient remaining battery capacity gives priority to meeting the required data transfer rate rather than harvesting the energy. The receiver with an insufficient remaining battery capacity gives priority to harvesting the energy rather than meeting the transfer rate for an energy neutral operation.

In the present invention, different kinds of signals are used according to the rate-energy QoS. The transmitter may enhance the transfer rate by using the single tone signal. Further, the transmitter may enhance the power transfer efficiency by using the single tone signal when the receiver has high received power (i.e., when the power of the signal received by the receiver is high). On the contrary, the transmitter may enhance the power transfer efficiency by using the multi-tone signal when the receiver has low received power (i.e., when the power of the signal received by the receiver is low). Further, the transmitter may have wider energy coverage by using multi-tone signal. That is, the receiver and the transmitter of the present invention operate in a dual mode including a mode (hereinafter, referred to as a single tone transmission mode, a single tone mode, or a single tone communication mode) using the single tone signal and a mode (hereinafter, referred to as a multi-tone transmission mode, a multi-tone mode, or a multi-tone communication mode) using the multi-tone signal. The details will be described below.

FIG. 8 is an internal block diagram of a transmitter according to an embodiment of the present invention.

FIG. 8 is an internal block diagram of a transmitter (wireless power transfer apparatus (8010) proposed in the present specification. Referring to FIG. 8, the transmitter 8010 includes a single tone signal generating unit 8020 and a multi-tone signal generating unit 8030. The single tone signal generating unit 8020 and the multi-tone signal generating unit 8030 are included in a signal generating unit.

Although not illustrated in FIG. 8, the transmitter 8010 may further include a communication unit and a control unit. The communication unit transmits the generated signal to the receiver and communicates with the outside. The control unit controls the communication unit and the signal generating unit. The generated signal may be transmitted through an antenna connected to the communication unit.

The signal generating unit generates a signal for transferring data and power. Hereinafter, the signal for simultaneously transferring the data and the power using one signal may also be referred to as a power signal. Both the single tone signal and the multi-tone signal correspond to a power signal.

The signal generating unit generates the signal according to the single tone transmission mode or the multi-tone transmission mode based on communication mode information. The communication mode information is transferred from the receiver. The communication mode information indicates a type of a transmission mode to be used for transferring the power signal. The signal generating unit generates the single tone signal using the single tone signal generating unit 8020 or generates the multi-tone signal using the multi-tone signal generating unit 8030 according to the mode indicated by the communication mode information.

The signal generating unit selectively switches one generator to generate the power signal of the single tone signal generating unit and the multi-tone signal generating unit based on the communication mode information transferred from the receiver. As an example, when the transmitter 8010 obtains the communication mode information indicating the multi-tone mode while generating the signal through the single tone signal generating unit 8020, the transmitter 8010 generates the signal through the multi-tone signal generating unit 8030. The communication mode information includes a modulation index. The modulation index is related to the number of combinations of the energy level and the phase of the single tone signal or the number of subcarriers of the multi-tone signal. The details of the generation of the communication mode information and the modulation index will be described below.

The single tone signal generating unit 8020 generates the single tone signal. The single tone signal is a single frequency sinusoidal signal and has multiple levels. Herein, the level represents the energy level. The single tone signal is a signal modulated by phase-shift keying (PSK). That is, the single tone signal is a multi-level PSK modulation waveform. Phase information and energy information of the single tone signal are separately obtained by the receiver and are together used while demodulation. The details of the phase information and the energy information of the single tone signal will be described below.

The multi-tone signal generating unit 8030 generates the multi-tone signal. The multi-tone signal is a multi-frequency sinusoidal signal and is modulated by a peak-to-average power ratio (PAPR) scheme. That is, the multi-tone signal is a PAPR based modulation waveform.

When the power (hereinafter referred to as received power) of the received signal is high, the single tone signal has higher wireless power transfer efficiency than the multi-tone signal due to the nonlinearity of the rectifier. As an example, the receiver may determine a case where the received power is −3 dBm or more as a case where the received power is high. The single tone signal may achieve higher transfer rate than multi-tone signal when the remaining battery capacity is sufficient. The signal generating unit may generate a single tone signal having a combination of an energy level and a phase corresponding to the modulation index included in the communication mode information. The modulation index represents the number of combinations of an energy level and a phase of the single tone signal in order to meet a required transfer rate of the signal. Through the above scheme, the transmitter 8010 may supply energy for an energy neural operation to the receiver and may meet the transfer rate required by the receiver.

When the received power is low, the multi-tone signal has higher wireless power transfer efficiency than the single tone signal due to the nonlinearity of the rectifier. As an example, the receiver may determine a case where the received power is −3 dBm or less as a case where the received power is low. Therefore, the multi-tone signal is suitable for supplying the power to receivers with low received power using the same transfer power. The signal generating unit may generate a multi-tone signal having a number of subcarriers corresponding to the modulation index included in the communication mode information. The modulation index indicates the number of subcarriers for meeting the required transfer rate and a required battery charging capacity. Further, when the PAPR of the signal changes according to the number of subcarriers at the time of using the multi-tone signal, the information may be transferred through the PAPR. The PAPR of the received signal is almost independent of the state of the channel. Therefore, when the PAPR modulation technique is used, the receiver does not require channel state information (CSI). That is, the receiver may obtain the information by measuring only the PAPR with less energy without channel estimation.

FIG. 9 is an internal block diagram of a receiver according to an embodiment of the present invention.

FIG. 9 is an internal block diagram of a receiver (wireless power receiving apparatus) 9010 proposed in the present specification. Referring to FIG. 9, the receiver 9010 includes an energy harvesting unit 9020, a single tone signal processing unit 9030, a multi-tone signal processing unit 9040, and an adaptive PM-&-ID module 9050. The single tone signal processing unit 9030 and the multi-tone signal processing unit 9040 are included in a signal processing unit. Hereinafter, the energy harvesting unit 9020 may be referred to as a power harvesting unit and the adaptive PM-&-ID module 9050 may be referred to as a mode determination unit.

Although not illustrated in FIG. 9, the receiver 9010 may further include the communication unit and the control unit. The communication unit receives the signal transmitted from the transmitter and communicates with the outside. The control unit controls the communication unit, the power harvest, the mode determination unit, and the signal processing unit. The signal may be received through the antenna connected to the communication unit.

The energy harvesting unit 9020 includes a rectifier 9021, a DC-DC converter 9022, and a battery 9023. The energy harvesting unit 9020 continuously harvests the energy by using the received signal regardless of the communication mode. That is, the power for charging the battery 9023 is harvested. The energy harvesting unit 9020 uses an energy harvesting technique to harvest the energy. The received signal is converted to the DC signal through the rectifier 9021. Thereafter, the DC signal output from the rectifier 9021 is transferred to the DC-DC converter 9022. When the communication mode is the single tone transmission mode, the DC signal output from the rectifier 9021 is transferred even to an energy level detector 9032 and used to determine the energy level. The DC-DC converter 9022 transforms the voltage of the input DC signal and thereafter, transfers the DC signal to the battery 9023. The battery 9023 is charged with the DC signal transferred from the DC-DC converter 9022. The energy harvesting unit 9020 transfers remaining battery capacity information to the mode determination unit at all times or periodically.

A signal processing unit includes a signal tone signal processing unit 9030 and a multi-tone signal processing unit 9040. The signal processing unit processes the received signal through one processing unit according to the communication mode information. The single tone signal processing unit 9030 and the multi-tone signal processing unit 9040 use different demodulation schemes. The communication mode information is transferred from the mode determination unit.

The single tone signal processing unit 9030 is used in the single tone mode. The single tone signal processing unit 9030 obtains information of the single tone signal. The single tone signal processing unit 9030 includes a phase detector 9031, an energy level detector 9032, and a first decoder 9033. The phase detector 9031 detects the phase of the received signal. The energy level detector 9032 detects the energy level of the DC signal output from the rectifier. That is, the energy level detector 9032 obtains energy information of the received signal. The decoder 9033 demodulates the received signal using the energy information obtained from the energy level detector 9032 and the phase information obtained from the phase detector 9031. Due to such a structure, in the present invention, higher transfer rate may be achieved with less energy consumption than the conventional I/Q modulation technique in the related art.

The multi-tone signal processing unit 9040 is used in the multi-tone mode. The multi-tone signal processing unit 9040 obtains information of the multi-tone signal. The multi-tone signal processing unit 9040 includes an envelope detector 9041, a PAPR estimator 9042, and a decoder. The envelope detector 9041 detects an envelope of the received signal and transfers envelope information to the PAPR estimator 9042. The PAPR estimator 9042 obtains the PAPR of the received signal using the envelope. The decoder 9043 obtains mapped information from the PAPR. The multi-tone signal processing unit 9040 consumes less energy than the single tone signal processing unit 9030 that needs to obtain the phase information and the energy information. Further, the use of the multi-tone signal increases the efficiency of the wireless power transfer. Accordingly, the multi-tone mode is suitable for increasing the energy coverage while ensuring a minimum transfer rate when the remaining battery capacity is small and the received power is also low.

An adaptive PM-&-ID module 9050 (hereinafter, referred to as a mode determination unit for easy description) determines the communication mode based on the battery state, the received power, and a rate QoS(R_QoS). The mode determination unit 9050 continuously (at all times or periodically) monitors the battery state, the received power, the required transfer rate, and a rate-energy QoS for mode determination. The mode determination unit 9050 determines/controls the communication mode and additionally determines/controls the modulation index. The mode determination unit 9050 feeds back the determined communication mode information and modulation index information to the receiver (specifically, to the signal processing unit) and the transmitter. The signal processing unit may change or maintain the processing unit that processes the signal based on the communication mode information which is fed back. The transmitter generates the single tone signal or the multi-tone signal based on the communication mode information which is fed back. The details of the mode determination unit 9050 will be described below.

FIG. 10 is an internal block diagram of an adaptive PM-&-ID module according to an embodiment of the present invention.

Referring to FIG. 10, the mode determination unit (Adaptive PM-&-ID module) 9050 includes an energy monitoring unit 10010, a transfer rate monitoring unit 10020, and a feedback signal generating unit 10030.

The energy monitoring unit 10010 monitors a battery state B_1 and received power P_r. The transfer rate monitoring unit 10020 monitors a required transfer rate amount R_QoS. The battery state refers to the remaining battery capacity. The battery state is related to a required energy amount (energy QoS) of the receiver. The feedback signal generating unit 10030 determines the communication mode and the modulation index based on information of the energy monitor 10010 and the transfer rate monitor 10020 generates a signal (hereinafter, referred to as a feedback signal) including the communication mode information and the modulation index information. Hereinafter, the feedback signal is then transmitted to the receiver and transmitter. That is, the communication mode information and the modulation index information are fed back to the receiver and the transmitter. Based on the feedback information, the transmitter may change the signal generating unit (single or multiple) which is currently used to another signal generating unit or maintain the corresponding signal generating unit and the receiver may also change the signal processing unit (single or multiple) which is currently used to another signal processing unit or maintain the corresponding signal processing unit.

As described above, a fact that the communication mode is adjusted in accordance with the battery state, the received power, and the required transfer rate is referred to as an Adaptive PM-&-ID policy (hereinafter, referred to as an adaptive policy for easy description). The receiver follows the adaptive policy in order to determine the communication mode and the modulation index. The adaptive policy is very important for a self-powering device. The details of the adaptive policy will be described below.

FIG. 11 illustrates power conversion efficiency of a multi-tone transmission mode depending on received power and the number of tones according to an embodiment of the present invention.

In FIG. 11, Table 1 below is represented by a graph.

TABLE 1

| | Power conversion efficiency (%) | | | | |
|---|---|---|---|---|---|
| Pin (dBm) | 1-tone | 2-tone | 4-tone | 8-tone | 16-tone |
| −20 | 0.0 | 0.0 | 0.0 | 0.0 | 0.0 |
| −15 | 0.7 | 1.6 | 2.8 | 3.6 | 3.6 |
| −10 | 7.1 | 10.1 | 11.2 | 12.8 | 12.8 |
| −5 | 6.3 | 8.6 | 12.0 | 15.5 | 17.6 |
| 0 | 55.6 | 52.0 | 46.8 | 42.0 | 32.4 |
| 5 | 65.7 | 53.1 | 48.7 | 43.2 | 37.3 |

TABLE 1-continued

| | Power conversion efficiency (%) | | | | |
|---|---|---|---|---|---|
| Pin (dBm) | 1-tone | 2-tone | 4-tone | 8-tone | 16-tone |
| 10 | 66.3 | 56.2 | 49.2 | 44.5 | 40.7 |
| 15 | 69.1 | 57.0 | 51.8 | 49.0 | 44.5 |

Referring to Table 1 and FIG. 11, it can be seen that the multi-tone transmission mode exhibits high wireless power transfer efficiency at low received power and higher wireless power transfer efficiency when the number of tones increases. On the other hand, at high received power, the single tone transmission mode has a higher efficiency than the multi-tone transmission mode.

FIG. 12 is a constellation diagram of a single tone signal depending on an energy level according to an embodiment of the present invention.

FIG. 12 is a constellation diagram of a single tone signal having two energy levels (levels 1 and 2) as an example. The number of levels may be changed.

As described above, the single tone signal is a multi-level PSK modulated waveform having multiple energy levels. In the single tone mode, the energy information and the phase information of the signal are separately obtained by the receiver and together while demodulation. The energy information determines the energy level on the constellation. The phase information determines a specific constellation location within the determined energy level. Through the above-described scheme, the receiver may meet the required transfer rate while harvesting the energy required for the energy neutral operation.

FIG. 13 is a flowchart illustrating a process of determining a communication mode and a modulation index according to an embodiment of the present invention.

Referring to FIG. 13, the mode determination unit (adaptive PM-&-ID module) of the receiver determines the communication mode and the modulation index based on the adaptive PM-&-ID policy. A specific process of the adaptive policy is described below.

Adaptive Policy (Adaptive PM-&-ID Policy)

Based on the adaptive policy, one communication mode of the single tone transmission mode or the multi-tone transmission mode is selected.

The receiver checks the state of the battery to determine the communication mode. When the remaining battery capacity is sufficient, the receiver gives priority to meeting the required data transfer rate rather than the harvested energy. However, when the remaining battery capacity is insufficient, the receiver gives priority to harvesting the energy for charging the battery rather than meeting the required transfer rate. To this end, the receiver determines the communication mode for efficiently charging the energy according to the received power. Hereinafter, a detailed description will be given with reference to FIG. 13.

First, the mode determination unit checks whether the remaining battery capacity B_1 is larger than a first threshold value B_th (S13010).

When the remaining battery capacity is larger than the first threshold value B_th, the mode determination unit checks whether the required transfer rate R_QoS is larger than a second threshold value R_th (S13020). Thereafter, when the required transfer rate R_QoS is larger than the second threshold value R_th, the mode determination unit determines the mode as the single tone mode (S13040). When the battery is sufficiently charged and the required transfer rate is high, the receiver selects the single tone mode to increase the transfer rate. When the required transfer rate R_QoS is equal to or smaller than the second threshold value R_th, the mode determination unit determines the mode as the multi-tone mode (S13060).

When the remaining battery capacity is equal to or smaller than the first threshold value B_th, the mode determination unit checks whether the received power P_r is larger than a third threshold value P_th (S13030). Thereafter, when the received power is P_r is larger than the third threshold value P_th, the mode determination unit determines the mode as the single tone mode (S13040). When the received power is P_r is equal to or smaller than the third threshold value P_th, the mode determination unit determines the mode as the multi-tone mode (S13060). The reason is that the receiver may be more efficiently charged by the multi-tone signal when the received power is low.

As an example, the mode determination unit may determine the mode as a single tone receive mode when the received power (power of the received power signal) is equal to or higher than −3 dBm or more and may determine the mode as a multiple tone receive mode when the received power is lower than −3 dBm.

After the communication mode is determined as the single tone transmission mode, the mode determination unit determines a first modulation index N to meet the required transfer rate (S13050). Since the single tone transmission mode is independent of the efficiency of the wireless power transfer, the receiver determines the modulation index only considering the required transfer rate (rate_QoS). In the single tone transmission mode, the modulation index represents the energy level and the number of phase combinations of the single tone signal.

After the communication mode is determined as the multi-tone transmission mode, the mode determination unit determines a second modulation index considering both the wireless power transfer efficiency and the required transfer rate (S13070). Referring to the description related to FIG. 6, there is a tradeoff between the wireless power transfer efficiency and the transfer rate when the multi-tone signal is used. In the multi-tone transmission mode, the transfer rate is determined when the wireless power transfer efficiency is determined. Therefore, when the mode is determined as the multi-tone transmission mode, the mode determination unit determines the second modulation index having a maximum transfer rate while meeting the required battery charge amount (energy_QoS). In the multi-tone transmission mode, the modulation index indicates the number of subcarriers of the multi-tone signal.

The mode determination unit feeds back the determined communication mode information and modulation index information to the receiver and the transmitter. The transmitter generates the single tone signal or the multi-tone signal through the signal generating unit based on the received communication mode information and index information. The generated signal is transmitted to the receiver again, thereby charging the battery of the receiver or enhancing the signal transfer rate.

The above-described process corresponds to the adaptive policy. A power transfer technique may also be controlled together with the information transfer technique through the adaptive policy. The transmitter/receiver uses the single tone transmission mode to demodulate the signal with lower power than the conventional I/Q modulation scheme in the related art and meet the rate_QoS with low energy consumption. The transmitter/receiver uses the multi-tone transmission mode to harvest more energy with low received power.

The present invention may secure wider energy coverage than the SWIPT technique in the related art by using two communication modes. In addition, in the present invention, since the receiver may operate even with low power, the self-powering devices are enabled to perform the energy neutral operation.

FIG. 14 illustrates a service area divided in a dual mode SWIPT scheme and a signal transfer scheme depending on an area according to an embodiment of the present invention.

Referring to FIG. 14, the service area may be divided into two areas according to a distance from the wireless power transfer apparatus (hereinafter, referred to as an AP for easy description). Two areas may be constituted by an inner zone 14010 and an outer zone 14020. Two areas are divided based on a distance from the AP, and a boundary of two areas is circular. The circular boundary may appear in an environment such as an open space. In such an environment, two areas may be implemented through the adaptive PM-&-ID policy based on the service area instead of the adaptive PM-&-ID policy based on the rate-energy QoS.

As an example, as illustrated in FIG. 14, the AP may improve the transfer rate by transferring the signal to the sensor included in the inner area 14010 through the single tone transmission mode. Further, the AP may broaden the energy coverage by transferring the signal to the sensor included in the outer zone 14020 through the multi-tone transmission mode.

As another embodiment, by applying multi-antennas and multi-rectennas to the transmitter/receiver proposed in the present invention, signals suitable for each wireless power receiving apparatus may be transferred by various methods. The use of the multi-antennas has an effect of increasing spatial diversity and may broaden the energy coverage through energy beamforming or focus more energy to a specific receiving node. The use of the multi-rectennas increases a dynamic range according to the input signal of the energy harvester. Therefore, by designing the optimal adaptive PM-ID policy based on the multi-antennas M, the modulation index N, and the multi-rectennas U, various rate-energy QoS may be met.

FIG. 15 is a flowchart of a wireless power transfer method performed by a wireless power transfer apparatus according to an embodiment of the present invention.

The wireless power transfer apparatus determines one signal generating unit of the single tone signal generating unit and the multi-tone signal generating unit based on the communication mode information to generate the power signal (S15010).

The wireless power transfer apparatus generates the power signal for transferring the data and the power using one determined signal generating unit (S15020).

The wireless power transfer apparatus transfers the power signal generated to the wireless power receiving apparatus through the communication unit (S15030).

Steps S15010, S15020, and S15030 may be performed in the same manner as described above with reference to FIG. 8, so that a detailed description thereof will be omitted.

FIG. 16 is a flowchart of a wireless power receiving method performed by a wireless power receiving apparatus according to an embodiment of the present invention.

The wireless power receiving apparatus receives the power signal transferred from the wireless power transfer apparatus through the communication unit (S16010).

The wireless power receiving apparatus harvests the power for charging the battery by the energy harvesting technique by using the power signal (S16020).

The wireless power receiving apparatus demodulates the power signal for data acquisition based on the communication mode information (S16030).

Steps S16010, S16020, and S165030 may be performed in the same manner as described above with reference to FIG. 9, so that a detailed description thereof will be omitted.

The technology described above can enhance a transfer rate of a signal and extend energy coverage by adjusting a communication mode of transferring information and power.

In addition, the technology described above can transfer the information and the power simultaneously to a receiver through the signal.

Further, the technology described above can preferentially charge a battery when remaining battery power is insufficient considering a state of a battery of the receiver.

The technology described above can achieve a higher transfer rate in high received power by using a single tone transmission mode.

The technology described above can harvest more energy in low received power by using a multi-tone transmission mode.

In the technology described above, the receiver has low complexity and low power consumption.

In the technology described above, a communication mode can be controlled according to the state of the receiver.

In the technology described above, the receiver periodically feeds back the communication mode to a transmitter, and as a result, the transmitter can generate an appropriate signal according to a situation.

Effects which can be obtained in the present invention are not limited to the aforementioned effects and other unmentioned effects will be clearly understood by those skilled in the art from the following description.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Further, in the case of implementation by firmware or software, the embodiment of the present invention may be implemented in the form of a module, a procedure, a function, and the like to perform the functions or operations described above and recorded in recording media readable by various computer means. Herein, the recording medium may include singly a program command, a data file, or a data structure or a combination thereof. The program command recorded in the recording medium may be specially designed and configured for the present invention, or may be publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. An example of the program command includes a high-level language code executable by a computer by using an interpreter and the like, as well as a machine language code created by a compiler. The hardware devices may be configured to operate as one or more software modules in order to perform the operation of the present invention, and an opposite situation thereof is available.

In addition, an apparatus or terminal according to the present invention may be driven by commands that cause one or more processors to perform the functions and processes described above. The commands may include, for example, interpreted commands such as script commands, such as JavaScript or ECMAScript commands, executable codes or other commands stored in computer readable media. Further, the apparatus according to the present invention may be implemented in a distributed manner across a network, such as a server farm, or may be implemented in a single computer device.

In addition, a computer program (also known as a program, software, software application, script or code) that is embedded in the apparatus according to the present invention and which implements the method according to the present invention may be prepared in any format of a compiled or interpreted language or a programming language including a priori or procedural language and may be deployed in any format including standalone programs or modules, components, subroutines, or other units suitable for use in a computer environment. The computer program does not particularly correspond to a file in a file system. The program may be stored in a single file provided to a requested program, in multiple interactive files (e.g., a file storing one or more modules, subprograms, or portions of code), or in a part (e.g., one or more scripts stored in a markup language document) of a file storing another program or data. The computer program may be deployed to be executed on multiple computers or on one computer, located on a single site or distributed across multiple sites and interconnected by a communication network.

The embodiments and the drawings appended in the present specification just express only a part of the technical idea included in the above-described technology. It will be apparent to those skilled in the art that modified examples and specific embodiments that can be easily devised by those skilled in the art are included within the scope of the technical spirit included in the specification of the above description and the drawings.

What is claimed is:

1. A wireless power transfer apparatus transferring data and power to a wireless power receiving apparatus by using a power signal, the wireless power transfer apparatus comprising:
   a signal generating unit generating the power signal for transferring the data and the power;
   a communication unit transferring the power signal generated by the signal generating unit to the wireless power receiving apparatus and communicating with the outside; and
   a control unit controlling the signal generating unit and the communication unit,
   wherein the signal generating unit generates the power signal according to one communication mode of a single tone transmission mode and a multi-tone transmission mode based on communication mode information transferred from the wireless power receiving apparatus through the communication unit, and
   the single tone transmission mode and the multi-tone transmission mode use different modulation schemes respectively.

2. The wireless power transfer apparatus of claim 1, wherein the signal generating unit includes a single tone signal generating unit generating a single tone signal when the communication mode information indicates the single tone transmission mode, and
a multi-tone signal generating unit generating a multi-tone signal when the communication mode information indicates the multi-tone transmission mode, and
the single tone signal as a single-frequency sinusoidal signal is a signal modulated in a phase-shift keying scheme with multi-level and the multi-tone signal as a multi-frequency sinusoidal signal is a signal modulated in a peak-to-average power ratio scheme.

3. The wireless power transfer apparatus of claim 1, wherein the signal generating unit selectively switches one generating unit to generate the power signal of the single tone signal generating unit and the multi-tone signal generating unit based on the communication mode information transferred from the wireless power receiving apparatus, and
   the communication mode information is generated by the wireless power receiving apparatus and fed back to the wireless power transfer apparatus.

4. The wireless power transfer apparatus of claim 2, wherein when the communication mode is the single tone transmission mode,
   the signal generating unit generates the single tone signal based on a first modulation index included in the communication mode information, and
   the first modulation index represents the number of combinations of an energy level and an phase of the single tone signal in order to meet a required transfer rate of the power signal.

5. The wireless power transfer apparatus of claim 2, wherein when the communication mode is the multi-tone transmission mode,
   the signal generating unit generates the multi-tone signal having a number of subcarriers corresponding to a second modulation index included in the communication mode information, and
   the second modulation index represents the number of subcarriers for meeting the required transfer rate of the power signal and a required battery charge amount of the wireless power receiving apparatus.

6. The wireless power transfer apparatus of claim 1, wherein the communication unit is connected with multi-antennas or multi-rectennas, and the power signal is transferred to the wireless power receiving apparatus through the multi-antennas or the multi-rectennas.

7. A wireless power receiving apparatus obtaining data and power by using a power signal transferred from a wireless power transfer apparatus, the wireless power receiving apparatus comprising:
   a communication unit receiving the power signal transferred from the wireless power transfer apparatus and communicating with the outside;
   a power harvesting unit harvesting power for charging a battery of the wireless power receiving apparatus from the power signal by using an energy harvesting technique;
   a mode determination unit determining one communication mode of a single tone mode using a single tone signal and a multi-tone mode using a multi-tone signal as the power signal for communication with the wireless power transfer apparatus; and
   a signal processing unit demodulating the power signal according to the communication mode determined by the mode determination unit to obtain data,
   wherein the single tone signal is a single-frequency sinusoidal signal, the multi-tone signal is a multi-frequency sinusoidal signal, and the single tone mode and the multi-tone mode use different modulation schemes respectively, and the mode determination unit determines one communication mode based on received power of the power signal, a required transfer rate of the power signal required by the wireless power receiving apparatus, and a state of the battery.

8. The wireless power receiving apparatus of claim 7, wherein the mode determination unit determines the communication mode by periodically monitoring the state of the battery, the received power, and the required transfer rate, and information of the determined communication mode is fed back to the signal processing unit and the wireless power transfer apparatus.

9. The wireless power receiving apparatus of claim 8, wherein the power signal is generated by the wireless power transfer apparatus based on the communication mode information which is fed back.

10. The wireless power receiving apparatus of claim 7, wherein the single tone signal is a signal modulated in a phase-shift keying scheme with multi-level and the multi-tone signal is a signal modulated in a peak-to-average power ratio scheme.

11. The wireless power receiving apparatus of claim 7, wherein the signal processing unit includes a single tone signal processing unit including a phase detector detecting a phase of a signal, an energy level detector detecting an energy level of the signal, and a first decoder, and a multi-tone signal processing unit including an envelope detector detecting an envelope of the signal, a PAPR estimator obtaining a PAPR of the signal, and a second decoder, and the received power signal is processed by the single tone signal processing unit when the communication mode determined by the mode determination unit is a single tone receive mode, and the received power signal is processed by the multi-tone signal processing unit when the communication mode is a multiple tone receive mode.

12. The wireless power receiving apparatus of claim 7, wherein the signal processing unit uses one of the single tone signal processing unit and the multi-tone signal processing unit based on the communication mode information fed back by the mode determination unit.

13. The wireless power receiving apparatus of claim 7, wherein the power harvesting unit includes a rectifier converting the power signal which is a sinusoidal signal into a DC signal, a DC-DC converter transforming voltage of the DC signal output from the rectifier in order to charge the battery of the wireless power receiving apparatus, and a battery charged by using the transformed DC signal output from the DC-DC converter, the power harvesting unit harvests the power from the power signal regardless of a type of the communication mode, and when the communication mode is the single tone receive mode, the DC signal output from the rectifier is transmitted to the signal processing unit and used for determining the energy level of the power signal.

14. The wireless power receiving apparatus of claim 13, wherein when the communication mode is the single tone receive mode, the energy level of the power signal is determined by using the DC signal output from the rectifier.

15. The wireless power receiving apparatus of claim 7, wherein the mode determination unit includes an energy monitoring unit obtaining state information of the battery and the received power information, a transfer monitoring unit obtaining the required transfer rate by monitoring the wireless power receiving apparatus, and a feedback signal generating unit determining the communication mode based on the information obtained by the energy monitoring unit and the transfer rate monitoring unit and generating a feedback signal including the information of the determined communication mode, when the communication mode is the single tone mode, the feedback signal generating unit determines a first modulation index representing the number of combinations of the energy level and an phase of the power signal for meeting the required transfer rate, when the communication mode is the multi-tone mode, the feedback signal generating unit determines a second modulation index related to the number of subcarriers of the power signal for meeting a required battery charge amount and the required transfer rate, and the information of the first modulation index or the information of the second modulation index is included in the feedback signal.

16. The wireless power receiving apparatus of claim 7, wherein the mode determination unit determines the communication mode as the single tone receive mode when the remaining battery capacity is larger than a first threshold value and the required transfer rate is larger than a second threshold value, or, when the remaining battery capacity is equal to or smaller than the first threshold value and the received power is larger than a third threshold value, and the mode determination unit determines the communication mode as the multi-tone receive mode when the remaining battery capacity is larger than the first threshold value and the required transfer rate is equal to or smaller than the second threshold value, or, when the remaining battery capacity is equal to or smaller than the first threshold value and the received power is equal to or smaller than the third threshold value.

17. The wireless power receiving apparatus of claim 7, wherein the mode determination unit determines the communication mode as the single tone receive mode when the power of the received power signal is equal to or higher than −3 dBm and determines the communication mode as the multiple tone receive mode when the power of the received power signal is less than −3 dBm.

18. A wireless power receiving method receiving, by a wireless power receiving apparatus, data and power by using a power signal transferred from a wireless power transfer apparatus by using a power signal, the method performed by the wireless power receiving apparatus, comprising:

receiving the power signal transferred from the wireless power transfer apparatus through a communication unit;

harvesting power for charging a battery by an energy harvesting technique by using the power signal; and demodulating the power signal in order to obtain the data based on communication mode information, wherein the power signal corresponds to a single tone signal which is a single-frequency sinusoidal signal or a multi-tone signal which is a multi-frequency sinusoidal signal generated by the wireless power transfer apparatus, the wireless power receiving apparatus demodulates the power signal by using different demodulation schemes according to the communication mode information, and the communication mode information corresponds to information which is determined based on a state of the battery, received power of the power signal, and a required transfer rate of the wireless power receiving apparatus and fed back by the wireless power receiving apparatus.

19. The method of claim 18, wherein the demodulating of the power signal further includes demodulating the power signal by using one of a single tone signal processing unit processing the single tone signal and a multi-tone signal processing unit processing the multi-tone signal in order to obtain the data based on the communication mode information, and the communication mode information includes one communication mode information either a single tone mode using the single tone signal processing unit or a multi-tone mode using the multi-tone signal processing unit.

20. The method of claim 18, further comprising:

determining one communication mode of the single tone mode using the single tone signal and the multi-tone mode using the multi-tone signal based on the state of the battery, the received power of the power signal, and the required transfer rate of the power signal required by the wireless power receiving apparatus; and feeding back the determined communication mode information to the wireless power transfer apparatus and the wireless power receiving apparatus.

* * * * *